3,293,223
**POLYESTERS FROM MIXTURES OF NAPHTHA-
LENE DICARBOXYLIC ACIDS**
Irl N. Duling West Chester, Pa., assignor to Sun Oil Company, Philadelphia, Pa., a corporation of New Jersey
No Drawing. Filed Mar. 3, 1964, Ser. No. 349,146
12 Claims. (Cl. 260—75)

This invention relates to novel polyesters, fibers and films prepared therefrom and methods of preparing the same. More particularly, this invention relates to polyesters having unique and unexpected beneficial properties and which are prepared from mixture of naphthalene dicarboxylic acids or esters thereof and certain diols.

Polyesters prepared from specific dicarboxylic acids and diols are well known in the art. For example linear condensation polyesters derived from terephthalic acid and 1,2-ethanediol are known which are capable of being drawn into fibers. The use of a single diol and a single diacid in preparing polyesters is somewhat undesirable in that the crystal structure and melting point of the polymer is predetermined since the constitution of the polymer cannot be varied. Recently, a limited amount of work has been reported on polyesters prepared from mixtures of diols and mixtures of diacids. Such polyesters have not achieved the desired degree of commercial success due to certain inherent disadvantages thereof including low glass transition points and low softening or melting points.

A polyester composition has now been found which possesses few of the disadvantages of prior art polyesters and unexpectedly possesses properties which are superior thereto.

Briefly stated, the instant invention comprises a condensation polymer of (A) a mixture selected from the group consisting of a mixture of the 2,6- and 2,7-isomers of naphthalene dicarboxylic acids and a mixture of the lower dialkyl esters of the 2,6- and 2,7-isomers of naphthalene dicarboxylic acids and (B) a diol selected from the group consisting of 1,4-cyclohexanedimethanol, 1,2-ethanediol, 1,3-propanediol and 1,4-butanediol, the relative proportions of the (A) and (B) constituents being such as to form a polyester having a molecular weight in the range of from 2400 to 24,000 and the weight ratio of 2,6-isomer to 2,7-isomer in said polyester being in the range of 19:1 to 1:3.

Naphthalene dicarboxylic acids can be prepared by a number of various methods. One such method involves the oxidation of dimethylnaphthalene isomers obtainable from a cracked petroleum fraction of appropriate boiling range by solvent extraction with furfural or by azeotropic distillation with diethylene glycol.

The oxidation of the dimethylnaphthalene isomers can be performed utilizing molecular oxygen (e.g., air) at temperatures in the range of 100°–250° C. in the presence of a catalyst system comprising a heavy metal oxidation catalyst and elemental bromine or a bromine compound. This type of oxidation process has been described in Saffer et al., United States Patent No. 2,833,816. By way of example, 2,6-dimethylnaphthalene can be converted to the corresponding diacid by contacting an acetic acid solution of the dimethylnaphthalene containing a cobalt acetate-ammonium bromide co-catalyst with molecular oxygen at a temperature in the range of 110°–135° C.

Another suitable procedure for converting dimethylnaphthalene isomers to the corresponding dicarboxylic acids involves the use of nitrogen dioxide ($NO_2$) in combination with selenium. This procedure involves dissolving the dimethylnaphthalene in an inert solvent such as trichlorobenzene, adding a small amount of selenium to the mixture and contacting the mixture in liquid phase with gaseous $NO_2$ at a temperature above 140° C., preferably in the range of 180°–225° C. This procedure is capable of producing the diacid in a yield generally in excess of 80% of the theoretical.

As stated above, the novel polymers of this invention are prepared from mixtures of specific naphthalene dicarboxylic acids or the lower dialkyl (i.e., $C_1$–$C_6$) esters thereof and a diol selected from the group consisting of 1,4-cyclohexane-dimethanol, 1,2-ethanediol, 1,3-propanediol and 1,4-butanediol. The preferred starting materials used in preparing the polymers of this invention are mixtures of the dimethyl esters of naphthalene-2,6-dicarboxylic acid and naphthalene-2,7-dicarboxylic acid and 1,2-ethanediol. The polyesters are prepared by a trans-esterification reaction.

A trans-esterification, or as it is sometimes called—an ester interchange—method for preparing polyesters is well known. This method of preparation generally proceeds as follows:

(a) The diester or diacid and diol reactants are heated in the presence of a catalyst. A monohydric alcohol is concurrently distilled off.

(b) As the temperature is raised, polymerization is incited and the excess diol is distilled off.

(c) The polymerization is completed by reducing the pressure on the system and removing the last traces of diol formed in the condensation reaction.

The novel polyesters prepared from a mixture of naphthalene-2,6-dicarboxylic acid and naphthalene-2,7-dicarboxylic acid or the dialkyl esters thereof and a diol exhibit certain interesting, unique and unexpected properties. While higher molecular weight n-aliphatic $\alpha,\omega$-diols other than those specified above will condense with the mixture of naphthalene dicarboxylic acids or dialkyl esters thereof to form polymeric materials, the properties of the products so prepared are substantially inferior to products prepared using the preferred diols and generally the products cannot be used in the same applications.

In general it has been found that polymers having unexpected properties can be prepared from a mixture of naphthalene-2,6-dicarboxylic acid and naphthalene-2,7-dicarboxylic acid or the dialkyl esters thereof wherein the amount of naphthalene-2,7-dicarboxylic acid or dialkyl ester thereof is present in the mixture in an amount in the range of from 5 to 75 percent by weight. If the amount of the 2,7-isomer present in the mixture is in the range of from 5 to 40 percent by weight there is produced a crystalline product useful in the preparation of fibers and films. These fibers and films can be formed from the polymers by conventional melt extrusion procedures. For example, the polyesters can be melt extruded vertically at a melt temperature of approximately 25° C. above the melting point of the polyester and immediately thereafter quenched and subsequently oriented.

On the other hand, polyesters prepared in accordance with this invention wherein the mixture of naphthalene-2,6-dicarboxylic acid and naphthalene-2,7-dicarboxylic acid or dialkyl esters thereof contains from 45 to 75 percent by weight of the 2,7-isomer, are amorphous and unexpectedly have high glass transition points. Due to these properties of amorphousness and high glass transition points, these polyesters are particularly suitable for use as supported films and in other applications where tensile properties are not foremost.

The superior properties of the novel polyesters of this invention are truly surprising when it is realized that polyesters prepared from naphthalene-2,7-dicarboxylic acid or the dialkyl ester thereof are totally unsuitable for use as fibers or films. The reason for the inapplicability of naphthalene-2,7-dicarboxylic acid or the dialkyl ester thereof to form polyesters which have particular utility as fibers and films is due to the formation of a crystalline oligomer concurrent with the formation of the polyester. This material constitutes a substantial amount of the material produced. The crystalline oligomer forms a heterogeneous mixture with the polyester material. The presence of these crystalline materials prevents the formation of clear and transparent supported or unsupported films. In addition the presence of this microcrystalline material prevents the formation of suitably uniform fibers. Therefore the fact that polyesters prepared using a mixture of naphthalene-2,7-dicarboxylic acid and naphthalene-2,7-dicarboxylic acid or the dialkyl esters thereof wherein the amount of 2,7-isomer present in the mixture can be as high as 75 percent by weight are homogeneous and suitable for use as fibers and/or films is indeed surprising.

In the preferred embodiment of the instant invention a mixture of the dimethyl esters of naphthalene-2,6-dicarboxylic acid and naphthalene-2,7-dicarboxylic acid and 1,2-ethanediol wherein the molar ratio of the esters to the diol is in the range of from 1:10 to 1:1, preferably 1:4 to 1:2, is added to any suitable reaction vessel. The reaction vessel can be of any suitable material such as glass, stainless steel or any of the other metals commonly employed in processing polyester resins. A catalyst condensing agent is added to the reaction mass. The reaction mixture is than heated at a temperature in the range of from 150° C. to 225° C., preferably 175° C. to 200° C., at atmospheric pressure in a nitrogen atmosphere for a period of time in the range of from 2 hours to 6 hours. During this time methyl alcohol will be distilled from the reaction mixture. Polymerization is initiated by slowly raising the temperature to between 200° C. and 400° C., preferably 230° C. to 290° C. over a period of time of 0.5 to 2.0 hours. During the continuance of the polymerization at the temperature for an additional 0.5 to 3.0 hours, any unreacted excess 1,2-ethanediol is distilled from the reaction mixture. The pressure is then slowly reduced on the system to below 5 mm. over a period of time of 0.5 to 4.0 hours, followed by continued heating at the elevated temperature and reduced pressure for an additional 2 to 6 hours. In this latter step the last traces of the diol are distilled off and the reaction mixture becomes progressively more viscous.

The specific temperatures and heating periods may vary over wider ranges than those outlined above depending on the observed rate of reaction. In cases where reaction becomes sluggish, higher temperature and/or longer periods of time can be employed. In those cases where the polymer is solidified, or begins to solidify before it is apparent all of the diol has been removed, the temperature and/or the heating period are increased. The conditions can be varied considerably depending upon the degree of the polyesterification desired, the ultimate properties sought, stability of the polyester being produced and use for which the product is intended. When the desired viscosity is reached under the above-described conditions, evacuation and heating are discontinued, the vessel allowed to cool to approximately room temperature, and the polyester removed.

In theory a total of only one mole of the diol is necessary to effect complete polyesterification with one mole of the mixture of the diesters. However, in practice, it is difficult to attain complete reaction under these conditions. It is therefore usually necessary to utilize an excess of the diol, preferably at least two moles of diol to one mole of the mixture of the diesters. Quantities substantially larger than about 2 moles of the diol can be used; however, since they are not necessary, in the interests of economy, they are not recommended.

The catalytic condensing agents which can be employed are conventional ester-interchange catalysts and include, for example, the alkali metals, the alkaline earth metals; the oxides, carbonates, and borates of these two groups of metals; the one to six carbon alkoxides of these two groups of metals; magnesium, zinc, and manganese; the oxides of these metals; zinc borate; the sulfates, phosphates and acetates of zinc, cadmium, magnesium, aluminum and copper; litharge or a combination of litharge with antimony trioxide or pentoxide and triphenyl phosphite as described in United States Patent No. 2,650,213; compounds of the formula $$M[Al(OR)_4]$$

wherein M is an alkali metal, e.g., lithium, sodium, or potassium, and R is an alkyl radical containing from 1 to 6 carbon atoms; R can be derived from a lower aliphatic alcohol such as methyl, ethyl, propyl, n-butyl, isobutyl, n-amyl, etc., as described in United States Patent No. 2,720,506; a composition consisting of lithium hydride and a glycol-soluble organic salt of cadmium, magnesium or zinc as described in United States Patent No. 2,681,360.

From about 0.005% to about 0.2% of such catalysts based on the weight of the mixture of the naphthalene dicarboxylic acids or esters being condensed can be employed. Higher or lower percentages can also be employed. Generally, from about 0.01% to about 0.05% of the catalytic condensing agent can be advantageously employed, based on the weight of the mixture of diacids or diesters. As will be apparent to those skilled in the art, it is generally advantageous from a cost standpoint to utilize the minimum quantity of one of the above catalysts which effects optimum results. Obviously, however, quantites larger or smaller than those outlined above will be employed by those skilled in the art where needed, e.g., to accelerate or to decelerate rate of reaction, to modify properties such as luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sulfolane, etc. It is essential to exclude oxygen at all stages of the condensation reaction. Otherwise discoloration, low molecular weight, and/or insolubilization of the polyester results. Inert atmospheres which can advantageously be employed include nitrogen, hydrogen, helium, etc.

Discoloration and low molecular weight products are also avoided by the utilization of essentially pure reagents. Since the dimethyl esters are easier to purify than are the naphthalene dicarboxylic acids, the esters are the preferred starting materials. The molecular weight of the polymer can be stabilized by the addition of a "short stopping agent" such as an aliphatic monohydric alcohol or monobasic acid having from 1 to 6 carbon atoms.

The polyesters of this invention can be produced by continuous methods; for example, the required amounts of the several reactants and catalyst can be continuously metered into the reaction vessel, maintained therein for the required reaction time under the required reaction conditions of temperature and pressure and then continuously drawn off.

Films, fibers or molded objects prepared from the polyesters of this invention can possess, among others, the following superior properties: (1) transparency, (2) high softening or melting points, (3) pliability, (4) high glass transition points, (5) high tensile strength, (6) high deformation temperatures, and (7) excellent solvent resistance.

The following examples further illustrate the instant invention.

EXAMPLE I.—PREPARATION OF NAPHTHALENE-2,6-DICARBOXYLIC ACID

The apparatus consists of a 3-liter flask fitted with a stirrer and having baffles along the sides to give effective agitation. Inlets are provided for the introduction of NO₂ and a solution of the 2,6-dimethylnaphthalene, reaching to near the bottom of the flask. A reflux or other condenser attached to the top returns condensed vapor (other than water) to the flask. An overflow outlet near the top permits the exit of the oxidized mixture for further processing.

Into the flask there were placed 10 gm. of selenium and 2000 cc. of trichlorobenzene. The mixture was heated to 105° C. NO₂ was introduced to oxidize the selenium. 100 gm. of 2,6-dimethylnaphthalene were added which immediately caused the selenium dioxide to be reduced to selenium as evidenced by the disappearance of the solid selenium dioxide slurry and the formation of a clear red solution.

NO₂ gas was introduced at the rate of 1.5 to 1.6 gm. per minute until 24 gm. of condensed water were collected from the exit gases. The temperature was permitted to rise from 185° C. to 200° C. at the end of the reaction. The exit gases were essentially colorless showing practically complete reduction of the NO₂ to NO.

The contents of the flask were cooled; the solids separated by filtration, washed successively with isooctane and water, and dried. The product weighed 111 gm. and had a neutralization equivalent of 154.

EXAMPLE II.—PREPARATION OF DIMETHYL ESTER OF NAPHTHALENE-2,6-DICARBOXYLIC ACID

Into a glass lined reactor there were placed 100 gm. of the diacid as prepared in Example I, 750 gm. of methanol, and 10 gm. of 80% sulfuric acid. The mixture was heated with agitation to a temperature of 130° C. An autogenous pressure of 150 p.s.i.g. was developed. The reaction mixture was maintained at the above conditions for 4 hours after which the mixture was allowed to cool to ambient temperatures and was separated by means of a centrifuge. The solid fraction was reslurried with methanol in a weight ratio of 2:1 methanol:solids. The resulting mixture was separated by means of a centrifuge and the solid fraction was dried in an air oven at 60° C. to a 1% maximum residual methanol content. The dried material was identified as the dimethyl ester of naphthalene-2,6-dicarboxylic acid by its melting point of 190°–193° C., its infrared spectra and elemental analysis.

EXAMPLE III.—PREPARATION OF NAPHTHALENE-2,7-DICARBOXYLIC ACID

Example I is repeated except that 2,7-dimethylnaphthalene is used instead of 2,6-dimethylnaphthalene. The material recovered is identified as naphthalene-2,7-dicarboxylic acid.

EXAMPLE IV. — PREPARATION OF DIMETHYL ESTER OR NAPHTHALENE-2,7-DICARBOXYLIC ACID

Example II was repeated except that naphthalene-2,7-dicarboxylic acid was used instead of naphthalene-2,6-dicarboxylic acid. The material recovered was identified as the dimethyl ester of naphthalene-2,7-dicarboxylic acid.

EXAMPLE V.—PREPARATION OF POLYESTERS

A series of polyesters was prepared using the dimethyl esters of naphthalene-2,6-dicarboxylic acid and naphthalene-2,7-dicarboxylic acid as prepared in Examples II and IV. These polyesters were prepared from various mixtures of the 2,6- and 2,7-isomers ranging from 100% by weight 2,6-isomer to 100% by weight 2,7-isomer.

In the preparation of the polyesters 30 gm. of the dimethyl ester or mixture of dimethyl esters were mixed with 30 cc. of redistilled 1,2-ethanediol. To this mixture there was added 0.006 gm. zinc oxide and 0.0105 gm. antimony pentoxide. The mixture was heated in an atmosphere of nitrogen at a temperature of 190°–195° C. for 4.75 hours. During this time methyl alcohol was distilled from the mixture.

The temperature was increased to 230° C. over a 2 hour period. During this time unreacted 1,2-ethanediol were distilled off.

To insure as complete a removal of unreacted diol as possible, the pressure on the system was reduced over an 0.5 hour period to about 1 mm. These conditions were maintained for about 2 hours. The mixture was cooled and there was recovered about 30 gm. of a polymeric product.

It will be understood and in fact is preferred that, even though in Examples I–IV inclusive the 2,6- and 2,7-isomers were treated separately, they can be oxidized and subsequently formed into the dimthyl esters directly from mixtures of 2,6- and 2,7-dimethylnaphthalene.

The various compositions of polyesters prepared and the properties of each are shown in the table.

*Table*

| Wt. Percent 2,6-isomer | Wt. Percent 2,7-isomer | Wt. ratio of 2,6- to 2,7-isomer | M.P., ° C. | G.T.P.,[1] ° C. | Polymer Form |
| --- | --- | --- | --- | --- | --- |
| 0 | 100 | | | | Heterogeneous. |
| 10 | 90 | 1:9 | | | Do. |
| 20 | 80 | 1:4 | | | Do. |
| 25 | 75 | 1:3 | | | Amorphous. |
| 30 | 70 | 3:7 | | 108 | Do. |
| 55 | 45 | 11:9 | | 100 | Do. |
| 75 | 25 | 3:1 | 232 | 99 | Crystalline. |
| 90 | 10 | 9:1 | 245 | 104 | Do. |
| 100 | 0 | | 263 | 100 | Do. |

[1] Glass transition point as measured by differential thermal analysis on quenched polymer.

As shown in the table polymers prepared from the 2,7-isomer alone or from a mixture of 2,6- and 2,7-isomers wherein the 2,7-isomer is present in an amount of at least 75% by weight are heterogeneous. As stated heretofore, due to the presence in such polymers of a crystalline oligomer, these products exhibit no utility as fibers or as oriented or supported films. Surprisingly, polyesters prepared from a mixture of 2,6- and 2,7-isomers wherein the 2,7-isomer is present in an amount of from about 45–75% by weight are amorphous, but possess unexpectedly high glass transition points of the order of magnitude of 100° C. or greater. Due to this combination of amorphousness and unexpectedly high glass transition points (conventional amorphous polyesters have a glass transition point of the order of only 65–90° C.) these polymers are uniquely suitable for supported film applications and other uses which do not require extreme tensile properties. Finally, these polymers prepared from the 2,6-isomer alone or a mixture of 2,6- and 2,7-isomers wherein the 2,7-isomer is present in an amount up to about 40% by weight have high melting points (in the range of 230–270° C.) and the glass transition points of the quenched polymer are about 100° C. or greater. Polymers prepared from the latter mixture of materials are crystalline as are the polymers prepared fom the 2,6-isome alone. As a result of this combination of properties as possessed by these polymers, fibers and films can be prepared therefrom which have unexpected and beneficial properties. For example, the melting point of the polyester can be "tailor-made" by varying the amount of 2,7-isomer in the starting mixture. This property of "tailor-made melting point" is of extreme importance in processing steps in that it is now possible to prepare polymeric materials having melting points suitably low enough that thermal degradation is substantially eliminated. Also it is unexpected that the polyesters of this invention when prepared from the mixture of isomeric materials retain a glass transition point substantially equivalent to the glass transition point of the polyester prepared from the 2,6-isomer alone.

Substantially identical results are obtained when other of the diols named above are substituted for 1,2-ethanediol in the examples.

I claim:

1. A condensation polymer of (A) a mixture selected from the group consisting of a mixture of the 2,6- and 2,7-isomers of naphthalene dicarboxylic acids and a mixture of the lower dialkyl esters of the 2,6- and 2,7-isomers of naphthalene dicarboxylic acids and (B) a diol selected from the group consisting of 1,4-cyclohexanedimethanol, 1,2-ethanediol, 1,3-propanediol and 1,4-butanediol, the relative proportions of the (A) and (B) constituents being such as to form a polyester having a molecular weight in the range of from 2400 to 24,000 and the weight ratio of 2,6-isomer to 2,7-isomer in said polyester being in the range of 1:3 to 19:1.

2. Polyesters in accordance with claim 1 wherein the molecular weight is in the range of from 8000 to 18,000.

3. A condensation polymer of (A) a mixture selected from the group consisting of a mixture of the 2,6- and 2,7-isomers of naphthalene dicarboxylic acids and a mixture of the lower dialkyl esters of the 2,6- and 2,7-isomers of naphthalene dicarboxylic acids and (B) a diol selected from the group consisting of 1,4-cyclohexanedimethanol, 1,2-ethanediol, 1,3-propanediol and 1,4-butanediol, the relative proportions of the (A) and (B) constituents being such as to form a crystalline polyester having a molecular weight in the range of from 2400 to 24,000 and the weight ratio of 2,6-isomer to 2,7-isomer in said polyester being in the range of 1.5:1 to 19:1.

4. Polyesters in accordance with claim 3 wherein the molecular weight is in the range of from 8000 to 18,000.

5. A condensation polymer of (A) a mixture selected from the group consisting of a mixture of the 2,6- and 2,7-isomers of naphthalene dicarboxylic acids and a mixture of the lower dialkyl esters of the 2,6- and 2,7-isomers of naphthalene dicarboxylic acids and (B) a diol selected from the group consisting of 1,4-cyclohexanedimethanol, 1,2-ethanediol, 1,3-propanediol and 1,4-butanediol, the relative proportions of the (A) and (B) constituents being such as to form an amorphous polyester having a molecular weight in the range of from 2400 to 24,000 and the weight ratio of 2,6-isomer to 2,7-isomer in said polyester being in the range of 1:3 to 11:9.

6. Polyesters in accordance with claim 5 wherein the molecular weight is in the range of from 8000 to 18,000.

7. A condensation polymer of (A) a mixture selected from the group consisting of a mixture of the 2,6- and 2,7-isomers of naphthalene dicarboxylic acids and a mixture of the dimethyl esters of the 2,6- and 2,7-isomers of naphthalene dicarboxylic acids and (B) a diol selected from the group consisting of 1,4-cyclohexanedimethanol, 1,2-ethanediol, 1,3-propanediol and 1,4-butanediol, the relative proportions of the (A) and (B) constituents being such as to form a polyester having a molecular weight in the range of from 2400 to 24,000 and the weight ratio of 2,6-isomer to 2,7-isomer in said polyester being in the range of 1:3 to 19:1.

8. Polyesters in accordance with claim 7 wherein the molecular weight is in the range of from 8000 to 18,000.

9. A condensation polymer of (A) a mixture selected from the group consisting of a mixture of the 2,6- and 2,7-isomer of naphthalene dicarboxylic acids and a mixture of the dimethyl esters of the 2,6- and 2,7-isomers of naphthalene dicarboxylic acids and (B) a diol selected from the group consisting of 1,4-cyclohexanedimethanol, 1,2-ethanediol, 1,3-propanediol and 1,4-butanediol, the relative proportions of the (A) and (B) constituents being such as to form a crystalline polyester having a molecular weight in the range of from 2400 to 24,000 and the weight ratio of 2,6-isomer to 2,7-isomer in said polyester being in the range of 1.5:1 to 19:1.

10. Polyesters in accordance with claim 9 wherein the molecular weight is in the range of from 8000 to 18,000.

11. A condensation polymer of (A) a mixture selected from the group consisting of a mixture of the 2,6- and 2,7-isomers of naphthalene dicarboxylic acids and a mixture of the dimethyl esters of the 2,6- and 2,7-isomers of naphthalene dicarboxylic acids and (B) a diol selected from the group consisting of 1,4-cyclohexanedimethanol, 1,2-ethanediol, 1,3-propanediol and 1,4-butanediol, the relative proportions of the (A) and (B) constituents being such as to form an amorphous polyester having a molecular weight in the range of from 2400 to 24,000 and the weight ratio of 2,6-isomer to 2,7-isomer in said polyester being in the range of 1:3 to 11:9.

12. Polyesters in accordance with claim 11 wherein the molecular weight is in the range of from 8000 to 18,000.

No references cited.

SAMUEL H. BLECH, *Primary Examiner.*

R. LYON, *Assistant Examiner.*